(12) United States Patent
Tsumori et al.

(10) Patent No.: US 9,657,221 B2
(45) Date of Patent: May 23, 2017

(54) WAVELENGTH CONVERSION MEMBER AND LIGHT-EMITTING DEVICE

(71) Applicant: SHIN-ETSU CHEMICAL CO., LTD., Tokyo (JP)

(72) Inventors: Toshihiro Tsumori, Echizen (JP); Takehisa Minowa, Echizen (JP); Masami Kaneyoshi, Echizen (JP); Kazuhiro Wataya, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 54 days.

(21) Appl. No.: 14/655,533

(22) PCT Filed: Dec. 26, 2013

(86) PCT No.: PCT/JP2013/084792
§ 371 (c)(1),
(2) Date: Jun. 25, 2015

(87) PCT Pub. No.: WO2014/104155
PCT Pub. Date: Jul. 3, 2014

(65) Prior Publication Data
US 2016/0002528 A1    Jan. 7, 2016

(30) Foreign Application Priority Data

Dec. 28, 2012 (JP) .................. 2012-287426

(51) Int. Cl.
*C09K 11/61* (2006.01)
*C09K 11/77* (2006.01)
(Continued)

(52) U.S. Cl.
CPC ............ *C09K 11/617* (2013.01); *C09K 11/02* (2013.01); *C09K 11/616* (2013.01);
(Continued)

(58) Field of Classification Search
CPC ..... C09K 11/617; C09K 11/02; C09K 11/616; C09K 11/7774; C09K 11/7792;
(Continued)

(56) References Cited

U.S. PATENT DOCUMENTS 8,796,915 B2 * 8/2014 Ooya ............... H05B 33/12
                                            313/318.01
8,907,558 B2 * 12/2014 Hiramatsu ........... H01L 33/504
                                            313/501
(Continued)

FOREIGN PATENT DOCUMENTS

JP          11-199781 A       7/1999
JP          2005-244076 A     9/2005
(Continued)

OTHER PUBLICATIONS

Japanese Office Action dated Dec. 1, 2015 issued in counterpart Japanese patent application No. 2014-554523. (5 pages).
(Continued)

*Primary Examiner* — Bao Q Truong
(74) *Attorney, Agent, or Firm* — Westerman, Hattori, Daniels & Adrian, LLP

(57) ABSTRACT

Disclosed is a wavelength conversion member which is a resin-molded article having dispersed therein a complex fluoride fluorophore that absorbs light with a blue wavelength component and emits light including a red wavelength component and that is represented by $A_2(M_{1-x}Mn_x)F_6$ (in the formula: M is at least one type of tetravalent element selected from Si, Ti, Zr, Hf, Ge, and Sn; A is at least one type of alkali metal selected from Li, Na, K, Rb, and Cs and including at least Na and/or K; and x is from 0.001 to 0.3), wherein the hue of the wavelength conversion member when light is not emitted is as follows in CIELAB (CIE 1976): L*=from 40 to 60 inclusive; a*=from 0 to +1 inclusive; and b*=from +2 to +15 inclusive.

20 Claims, 4 Drawing Sheets

(51) Int. Cl.

| | | |
|---|---|---|
| *F21V 9/16* | (2006.01) | |
| *F21V 3/04* | (2006.01) | |
| *C09K 11/02* | (2006.01) | |
| *F21K 9/64* | (2016.01) | |
| *F21Y 101/00* | (2016.01) | |
| *F21K 9/232* | (2016.01) | |
| *F21Y 115/10* | (2016.01) | |
| *F21Y 107/00* | (2016.01) | |

(52) U.S. Cl.
CPC ...... *C09K 11/7774* (2013.01); *C09K 11/7792* (2013.01); *F21K 9/64* (2016.08); *F21V 3/04* (2013.01); *F21V 9/16* (2013.01); *F21K 9/232* (2016.08); *F21Y 2101/00* (2013.01); *F21Y 2107/00* (2016.08); *F21Y 2115/10* (2016.08)

(58) Field of Classification Search
CPC ... F21K 9/64; F21K 9/232; F21V 3/04; F21V 9/16; F21Y 2107/00; F21Y 2115/10; F21Y 2101/00
See application file for complete search history.

(56) References Cited

U.S. PATENT DOCUMENTS

| | | |
|---|---|---|
| 2006/0091779 A1 | 5/2006 | Takeda et al. |
| 2007/0292631 A1 | 12/2007 | Shinozaki et al. |
| 2010/0188613 A1 | 7/2010 | Tsukahara et al. |
| 2011/0074271 A1 | 3/2011 | Takeshi et al. |
| 2012/0256125 A1 | 10/2012 | Kaneyoshi et al. |
| 2013/0169147 A1 | 7/2013 | Ooya et al. |
| 2014/0009061 A1 | 1/2014 | Itoga et al. |

FOREIGN PATENT DOCUMENTS

| | | |
|---|---|---|
| JP | 2006-135002 A | 5/2006 |
| JP | 2010-87267 A | 4/2010 |
| JP | 2010-209331 A | 9/2010 |
| JP | 2010-215729 A | 9/2010 |
| JP | 2010-251621 A | 11/2010 |
| JP | 2010-287680 A | 12/2010 |
| JP | 2011-91037 A | 5/2011 |
| JP | 2012-015175 A | 1/2012 |
| JP | 2012-023288 A | 2/2012 |
| JP | 2012-059893 A | 3/2012 |
| JP | 2012-094419 A | 5/2012 |
| JP | 2012-229373 A | 11/2012 |
| WO | 2012/029305 A1 | 3/2012 |
| WO | 2012/124267 A1 | 9/2012 |

OTHER PUBLICATIONS

Office Action dated Mar. 22, 2016, issued in counterpart Japanese Patent Application No. 2014-554523 (5 pages).
International Search Report dated Jan. 28, 2014 issued in corresponding application No. PCT/JP2013/084792 (2 pages).

* cited by examiner

WAVELENGTH CONVERSION MEMBER AND LIGHT-EMITTING DEVICE

TECHNICAL FIELD

This invention relates to a wavelength conversion member for improving the outer appearance color in the unlit state and the color development in the lit state of light-emitting devices using blue light-emitting diodes (LEDs) such as general purpose illuminating devices, backlight sources and headlight sources, and a light-emitting device of remote phosphor technology comprising the wavelength conversion member.

BACKGROUND ART

Light-emitting diodes (LEDs) belong to a class of the most efficient light sources among currently available light sources. In particular, white LEDs find a rapidly expanding share in the market as the next-generation light source to replace incandescent lamps, fluorescent lamps, cold cathode fluorescent lamps (CCFL) for backlight, and halogen lamps. As one configuration for white LED, a white LED device (LED lighting device) constructed by combining a blue light-emitting diode (blue LED) with a phosphor capable of emitting light of longer wavelength, for example, yellow or green light upon blue light excitation is implemented on a commercial basis.

The mainstream of the white LED structure is a system in which a phosphor in admixture with resin or glass is placed on or near a blue LED so that the phosphor layer substantially integrated with the blue LED may convert the wavelength of part or all of blue light to produce pseudo-white light, to be called white LED element system. Also some light-emitting devices are based on a system in which a phosphor is spaced apart from a blue LED by a distance of several millimeters to several tens of millimeters so that the phosphor may cause wavelength conversion to part or all of blue light. Particularly when the phosphor tends to degrade its properties by the heat generated by LED, the far distance of phosphor from the LED is effective for improving the efficiency of light-emitting device and suppressing the variation of color tone. A phosphor-containing wavelength conversion member to be spaced apart from an LED light source is known as remote phosphor plate, and such a light emitting system is known as "remote phosphor technology." Recently active efforts are made on the light emitting system of remote phosphor technology because an improvement in overall color variation and other improvements are advantageous when the system is used for illumination.

The light-emitting device of remote phosphor technology is generally constructed, for example, by placing a wavelength conversion member, which is made of resin or glass having yellow light-emitting phosphor (referred to as yellow phosphor, hereinafter) particles, green light-emitting phosphor (referred to as green phosphor, hereinafter) particles or red light-emitting phosphor (referred to as red phosphor, hereinafter) particles dispersed therein, forward of a blue LED as the remote phosphor, to provide a light emitting device wherein yellow fluorescence of center wavelength around 570 nm is emitted in response to incident blue light of wavelength around 450 nm and combined with light emitted by the blue LED and transmitted by the remote phosphor. Examples of the phosphor used as the remote phosphor include $Y_3Al_5O_{12}$:Ce, $(Y,Gd)_3(Al,Ga)_5O_{12}$:Ce, $(Y,Gd)_3Al_5O_{12}$:Ce, $Tb_3Al_5O_{12}$:Ce, $CaGa_2S_4$:Eu, $(Sr,Ca,Ba)_2SiO_4$:Eu, and Ca-α-SiAlON:Eu. Also, sulfide-based phosphors which are normally difficult to use on chips are generally used.

However, the light-emitting device of remote phosphor technology is constructed such that the wavelength conversion member containing yellow or green phosphor particles is disposed in a region where the contour of the light-emitting device is seen. The remote phosphor plate looking yellow as the outer appearance in the non-emissive state is often mounted in such a state that the plate may be seen from the outside, substantially detracting from the esthetic appearance of the light-emitting device in the unlit state. Thus for the prior art light-emitting devices, particularly in the application where outer appearance is important, an attempt is made to improve their outer appearance by enclosing the device in a white lamp shade with low transparency, but instead a lowering of emission efficiency is inevitable. While it is desirable in consideration of emission efficiency to omit such a lamp shade or cover, the resultant loss of the esthetic appearance in the unlit state becomes a dilemma.

SUMMARY OF INVENTION

Technical Problem

An object of the invention, which has been made under the above-mentioned circumstances, is to provide a wavelength conversion member which is effective for improving the outer appearance color of a light-emitting device of remote phosphor technology in the unlit state and offering light output of desired color in the lit state, and a light-emitting device comprising the wavelength conversion member.

Solution to Problem

Focusing on a resin phosphor plate made of a resin having a phosphor incorporated therein in order to improve the color of light emission of a light-emitting device, the inventors studied the type and mixing amount of phosphor, thickness of phosphor plate, and arrangement of phosphor plate in LED device. The inventors have found that when a wavelength conversion member which is a molded resin containing a phosphor capable of absorbing light with a blue wavelength component and emitting light containing a red wavelength component, specifically a specific complex fluoride phosphor is disposed on an optical axis of pseudo-white light, the color of light output of the light-emitting device is improved, and this wavelength conversion member to improve the color of light output exhibits a desirable pale yellow color with transparent sense in the non-emissive state. The invention is predicated on this finding.

Accordingly, the invention provides a wavelength conversion member and a light-emitting device as defined below.

[1] A wavelength conversion member which is a molded resin having dispersed therein a phosphor capable of absorbing light of a blue wavelength component and emitting light containing a red wavelength component wherein the wavelength conversion member in the non-emissive state has a color expressed as L*=40 to 60, a*=0 to +1, and b*=+2 to +15 according to CIELAB (CIE 1976).

[2] The wavelength conversion member of [1] wherein said phosphor is a complex fluoride phosphor having the formula (1):

$$A_2(M_{1-x}Mn_x)F_6 \qquad (1)$$

wherein M is one or two or more of tetravalent elements selected from Si, Ti, Zr, Hf, Ge, and Sn, A is one or two or more of alkali metals selected from Li, Na, K, Rb, and Cs and containing at least Na and/or K, and x is a number of 0.001 to 0.3.

[3] The wavelength conversion member of [2] wherein the complex fluoride phosphor is manganese-activated potassium silicofluoride of the formula: $K_2(Si_{1-x}Mn_x)F_6$ wherein x is as defined above.

[4] The wavelength conversion member of any one of [1] to [3] wherein the phosphor is present in an amount of 2 to 30% by weight.

[5] The wavelength conversion member of any one of [1] to [4], having an average thickness of 0.05 to 5 mm.

[6] The wavelength conversion member of any one of [1] to [5] wherein said resin is a thermoplastic resin.

[7] The wavelength conversion member of any one of [1] to [6] which is a lamp cover or lamp shade.

[8] A light-emitting device comprising a light-emitting element including an LED light source capable of emitting at least blue light, and adapted to emit pseudo-white light containing a blue wavelength component, and the wavelength conversion member of any one of [1] to [7], disposed outside the light-emitting element.

[9] The light-emitting device of [8], further comprising a transparent protective cover covering the wavelength conversion member.

Advantageous Effects of Invention

The inventive wavelength conversion member in the non-emissive state has a color expressed as $L^*=40$ to 60, $a^*=0$ to +1, and $b^*=+2$ to +15 according to CIELAB (CIE 1976). When the wavelength conversion member is disposed so as to cover a light-emitting device (lighting device), the outer appearance of the lighting device, especially light-emitting device of remote phosphor technology becomes of appropriate color in the unlit state.

Additionally, the light emission from the inventive wavelength conversion member is red light emission centering at wavelength 600 to 660 nm, which is added to the emission of the light-emitting device in the lit state, resulting in a light output of natural color.

DESCRIPTION OF EMBODIMENTS

Figure 1:
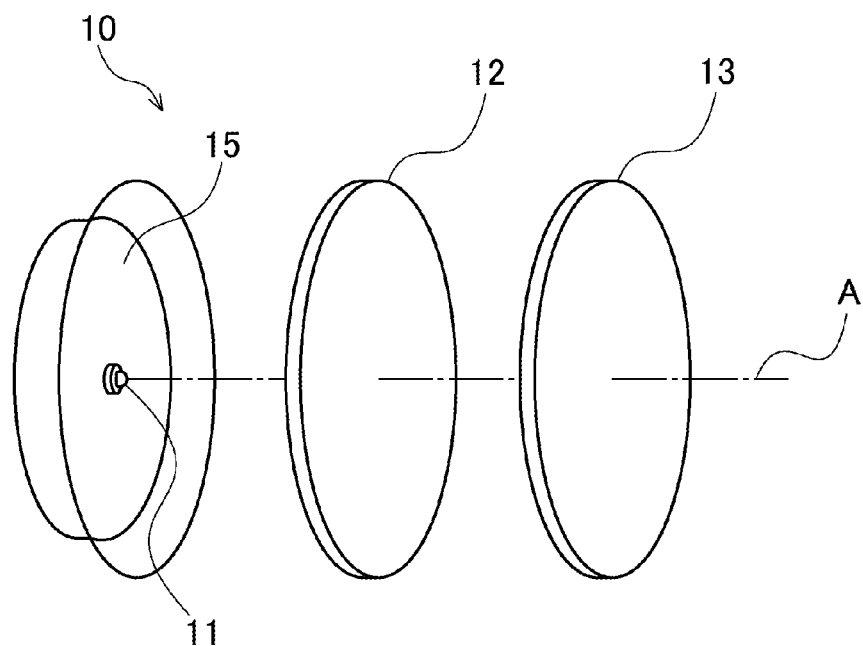
FIG. 1 is a schematic perspective view showing components of a light-emitting device according to a first embodiment of the invention.

The wavelength conversion member of the invention is described below.

The wavelength conversion member of the invention is a molded resin having dispersed therein a phosphor capable of absorbing light of a blue wavelength component and emitting light containing a red wavelength component. The wavelength conversion member in the non-emissive state has a color expressed as $L^*=40$ to 60, preferably $L^*=42$ to 52, $a^*=0$ to +1, preferably $a^*=+0.2$ to +0.6, and $b^*=+2$ to +15, preferably $b^*=+3$ to +12 according to CIELAB (CIE 1976).

The phosphor used herein is preferably a complex fluoride phosphor having the formula (1):

$$A_2(M_{1-x}Mn_x)F_6 \qquad (1)$$

wherein M is one or more tetravalent elements selected from among Si, Ti, Zr, Hf, Ge, and Sn, A is one or more alkali metals selected from among Li, Na, K, Rb, and Cs and containing at least Na and/or K, and x is a number of 0.001 to 0.3.

The phosphor is a manganese-activated complex fluoride phosphor having the structure of complex fluoride $A_2MF_6$ in which part of constituent element is replaced by manganese. In the Mn-activated complex fluoride phosphor, preferably the activator Mn is a replacement at the site of tetravalent element in $A_2MF_6$, as tetravalent manganese ($Mn^{4+}$), though the valence number is not limited thereto. In this sense, the phosphor may also be expressed as $A_2MF_6:Mn^{4+}$. Of these, a complex fluoride phosphor of the formula: $K_2(M_{1-x}Mn_x)F_6$ wherein M and x are as defined above is preferred, and manganese-activated potassium silicofluoride of the formula: $K_2(Si_{1-x}Mn_x)F_6$ wherein x is as defined above is most preferred.

The manganese-activated complex fluoride phosphor emits red light having an emission peak or maximum emission peak in the wavelength range of 600 to 660 nm, when excited by blue light of wavelength 420 to 490 nm, preferably 440 to 470 nm.

Also, the complex fluoride phosphor in the non-emissive state has a color expressed as $L^*=60$ to 70, $a^*=+1$ to +3, and $b^*=+15$ to +30 according to CIELAB (CIE 1976).

The technical reason why the outer appearance in the unlit state becomes of appropriate color is that unlike a nitride-based red phosphor commonly used as LED-compatible phosphor, the complex fluoride phosphor of formula (1) mainly used herein provides very little absorption of a light component of wavelength 500 to 700 nm among visible light, and low absorption of a light component of wavelength 430 to 470 nm which corresponds to the emission wavelength of blue LEDs commonly used in white LEDs, indicating that the body color the phosphor itself possesses is weak or thin. Further, since the nitride-based red phosphor commonly used in the conventional remote phosphor system or lighting fixture absorbs green to yellow light of wavelength 500 to 570 nm, the arrangement of the red phosphor outside a yellow or green light-emitting phosphor or light-emitting member invites a lowering of efficiency of the lighting device or difficult adjustment of emission color. Due to very little absorption of a light component of 500 to 700 nm, the complex fluoride phosphor mainly used herein is devoid of these drawbacks.

It is noted that the complex fluoride phosphor of formula (1) used herein may be one produced by a prior art well-known method, for example, by dissolving or dispersing a metal fluoride starting material in hydrofluoric acid, and heating the solution for evaporation to dryness.

The phosphor is preferably particulate and its particle size is 2 µm to 60 µm, preferably 10 µm to 40 µm, expressed as a volume basis 50% cumulative particle diameter D50 in particle size distribution. If the particle size D50 is less than 2 μm, the phosphor may have a low emission efficiency. If phosphor particles are coarse, non-uniform phosphor distribution and other drawbacks are likely to occur during mixing with the resin although the emission is free of essential problems. The phosphor with a particle size D50 of up to 60 μm has the advantage of convenient use.

For the measurement of particle size in the practice of the invention, a dry laser diffraction scattering method of spraying a test powder in air or dispersing a test powder suspended in air, irradiating laser light thereto, and determining a particle diameter from the diffraction pattern is preferable since the measurement is not affected by humidity and even a particle size distribution can be evaluated.

The mixing ratio of the phosphor and the resin (i.e., content of phosphor) in the wavelength conversion member of the invention is preferably approximately 2 to 30% by weight, more preferably 3 to 15% by weight, even more preferably 5 to 12% by weight, although the content varies with the thickness of the wavelength conversion member, the arrangement relative to exciting LED light, and the desired color of light output. If the phosphor content exceeds 30 wt %, the coloring of this phosphor becomes so intense that the outer appearance color in the non-emissive state may detract from the esthetic appearance of the light-emitting device. On the other hand, a phosphor content of less than 2 wt % may result in emission of less red light, losing a color rendering improving effect, although a phosphor content of less than 2 wt % is not always unacceptable.

The resin in which the phosphor is dispersed may be either thermoplastic or thermosetting. Preference is given to a thermoplastic resin which is chemically resistant to acids and alkalis and fully proof to humidity. The thermoplastic resin is also preferred in that it may be molded in a relatively short time by such techniques as injection molding, so that the resin with the phosphor, typically manganese-activated complex fluoride phosphor dispersed uniformly therein can be molded.

Examples of the light transmitting thermoplastic resin used herein include polyolefins such as polypropylene, polystyrenes such as general purpose polystyrene (GPPS), and styrene copolymers such as styrene-maleic acid copolymers, styrene-methyl methacrylate copolymers and acrylonitrile-butadiene-styrene (ABS) copolymers. One or more resins selected from these are preferably used.

As the thermoplastic resin used herein, a thermoplastic resin containing at least 40% by weight of polypropylene and/or polystyrene is more preferred. As the polypropylene, a polypropylene of random copolymer type containing ethylene units in a low content of 2 to 6% by weight is especially preferred, with an injection moldable polypropylene having a melt flow rate (MFR) of 5 to 30 g/10 min. as measured according to JIS K 7210 being most preferred.

In the wavelength conversion member of the invention, like prior art thermoplastic resin materials, additives such as antioxidant, stabilizers including photo-stabilizer and UV absorber, and mold lubricant may be compounded in an amount of 0.1 to 0.3% by weight, depending on a particular application. Particularly on use of polypropylene, if a lowering of strength during long-term service is a problem, a heavy metal inactivating agent may be added in a limited amount of 0.3% by weight at maximum.

Furthermore, when the content (or incorporated concentration) of the phosphor, typically manganese-activated complex fluoride phosphor is low, or for the purpose of increasing haze to make the light transmitted by the member uniform, a photo-diffusing agent may be mixed to improve the photo-diffusibility of the wavelength conversion member. Exemplary photo-diffusing agents include powdered inorganic ceramics such as talc, aluminum oxide, silicon oxide, aluminum silicate, and yttrium oxide. Inter alia, aluminum oxide and silicon oxide are preferred because of high optical transparency and a minimal loss of transmitted light when incorporated in resin. The photo-diffusing agent preferably has a particle size D50 of 0.005 to 5 μm. The amount of the photo-diffusing agent incorporated varies with the content of the phosphor and the thickness of the wavelength conversion member. When the wavelength conversion member is 2 mm thick and made of polypropylene having 4% by weight of manganese-activated complex fluoride phosphor, typically $K_2(Si_{1-x}Mn_x)F_6$ wherein x is 0.001 to 0.3 incorporated therein, for example, the amount of the photo-diffusing agent is preferably 0.05 to 5%, more preferably 0.05 to 1.5%, and even more preferably 0.1 to 0.5% by weight. A content of less than 0.05 wt % may provide an insufficient photo-diffusing effect whereas a content in excess of 5 wt % may detract from the light transmittance of the wavelength conversion member.

Also, the wavelength conversion member of the invention should preferably have a transmittance of 20 to 90%, more preferably 50 to 70% with respect to excitation light of wavelength 450 nm. If the transmittance is less than 20%, the light output from the light-emitting device to which the wavelength conversion member is applied may be short of blue light. If the transmittance exceeds 90%, the light output may contain excessive blue light.

When the resin for encapsulating the phosphor is a thermoplastic resin, the wavelength conversion member is manufactured by furnishing the thermoplastic resin and auxiliary agents as resin matrix and the phosphor in powder form, feeding them into a twin-screw extruder, milling them such that the phosphor powder is incorporated in the heated resin matrix, and heat molding the resin matrix, like general purpose plastic materials, into any desired shape for a particular application. For example, after the resin matrix and the phosphor are milled, the material may be directly molded into the desired thickness and shape suitable as a wavelength conversion member in a light-emitting device. Alternatively, once the material is molded into pellets, the pelleted material may be molded into a wavelength conversion member of the desired thickness and shape when necessary.

Preferably the wavelength conversion member has an average thickness of 0.05 to 5 mm. If the thickness is less than 0.05 mm, the wavelength conversion member may become difficult to sustain itself from lack of mechanical strength. If the thickness exceeds 5 mm, the wavelength conversion member may have a reduced transmittance. As used herein, the average thickness refers to an average of thickness of a portion of the wavelength conversion member which is light emissive in the light-emitting device.

The resin molding thus obtained becomes a wavelength conversion member in which phosphor particles, typically manganese-activated complex fluoride phosphor particles are encapsulated with the predetermined resin without alteration. The wavelength conversion member produces fluorescence in the red wavelength region of wavelength about 600 to 660 nm when excited by blue light of wavelength 420 to 490 nm, preferably wavelength 440 to 470 nm. Accordingly, when the wavelength conversion member is applied to a pseudo-white LED device, the red wavelength component of wavelength about 600 to 660 nm is added to the emission spectrum of the device, resulting in the light-emitting device with high color reproducibility.

Although the color of the inventive wavelength conversion member in the non-emissive state varies with the content of the phosphor, typically complex fluoride phosphor, the thickness of the wavelength conversion member and the like, the wavelength conversion member generally looks pale yellow in outer appearance. Specifically, the inventive wavelength conversion member in the non-emissive state has a color expressed as $L^*=40$ to 60, $a^*=0$ to $+1$, and $b^*=+2$ to $+15$ according to CIELAB (CIE 1976). The range of color of the inventive wavelength conversion member in the non-emissive state is determined by the content of the phosphor, typically complex fluoride phosphor, and concurrent additives such as photo-diffusing agent.

Prior art wavelength conversion members comprising yellow phosphors commonly used in the remote phosphor technology such as $Y_3Al_5O_{12}:Ce^{3+}$ phosphor exhibit a yellow fluorescent color as the outer appearance color in the non-emissive state. When this yellow colored wavelength conversion member is disposed in a light-emitting device outside a light-emitting element capable of emitting pseudo-white light, the esthetic appearance and design of the light-emitting device in the unlit state are substantially limited. In the application where the outer appearance is important, it is a common practice to mount a cover such as a white lamp shade with low transparency. In this case, the cover causes a reduction of the transmittance of light emission, leading to the drawback of a lower illumination efficiency.

In contrast, the inventive wavelength conversion member exhibits a pale yellow color with transparent sense as the outer appearance color in the non-emissive state. When the wavelength conversion member is disposed in a light-emitting device outside a light-emitting element, it does not detract from the esthetic appearance of the light-emitting device in the unlit state and eliminates a need for a conventional cover such as a lamp shade, as mentioned above, which becomes a cause for a drop of emission efficiency.

[Light-Emitting Device]

Next, the light-emitting device of the invention is described.

FIG. 1 is a perspective view showing components of a light-emitting device according to a first embodiment of the invention.

The light-emitting device of the invention is depicted at 10 in FIG. 1 as comprising an LED light source 11 capable of emitting blue light, an inventive wavelength conversion member (specifically red wavelength conversion member) 13 defined above, and another wavelength conversion member (specifically yellow or green wavelength conversion member) 12 containing a phosphor capable of absorbing blue light and emitting light of different wavelength from the phosphor in the member 13, both disposed on the optical axis A of the light source 11. With respect to the arrangement sequence of wavelength conversion members on an optical axis of the LED light source 11, the other wavelength conversion member 12 and the inventive wavelength conversion member 13 are arranged in sequence as viewed from the LED light source 11 side. That is, the wavelength conversion member 13 is arranged outside the light-emitting element including the LED light source 11 and the wavelength conversion member 12 and adapted to emit pseudo-white light containing a blue wavelength component.

The LED light source 11 used herein must emit light capable of exciting the phosphors in all the wavelength conversion members 12 and 13 disposed in the light-emitting device 10, and may emit, for example, blue light of emission wavelength 420 to 490 nm, preferably 440 to 470 nm. The LED light source 11 used in an LED light-emitting device is preferably a light source comprising a single LED chip or a plurality of LED chips.

The emission color of the light-emitting device 10 may be adjusted in terms of the thickness and phosphor content of wavelength conversion members 12 and 13.

The other wavelength conversion member 12 is a molded resin having a yellow or green phosphor dispersed therein. For example, it is preferably a yellow or green wavelength conversion member in which a prior art well-known yellow or green phosphor such as $Y_3Al_5O_{12}:Ce^{3+}$, $Lu_3Al_5O_{12}:Ce$ or $(Ba,Sr)_2SiO_5:Eu^{2+}$ is incorporated in a thermoplastic resin.

The content of the phosphor in the wavelength conversion member 12 is determined in consideration of the quantity of incident blue light, the quantity of light in the yellow or green wavelength region, the transmittance of blue light, and the like. In the case of a plate of 2 mm thick having $Y_3Al_5O_{12}:Ce$ phosphor incorporated therein, for example, the incorporated concentration is preferably 0.5 to 5% by weight, more preferably 2 to 4% by weight.

The wavelength conversion member 13, which is the inventive wavelength conversion member defined above, is configured such that it may receive light from the LED light source 11 and wavelength conversion member 12 and emit light efficiently as the light-emitting device. The wavelength conversion member 13 is preferably a (self-sustaining) member which may be independently handled alone in the light-emitting device 10. The shape of wavelength conversion member 13 is not limited to the disk shape shown in FIG. 1, and a spherical shape like an incandescent lamp is acceptable.

The wavelength conversion member 13 is spaced a distance of preferably 2 to 100 mm, more preferably 5 to 10 mm from the LED light source 11. Although a spacing outside the range is acceptable, there is a possibility that at a spacing of less than 2 mm, the wavelength conversion member can be affected and degraded by the heat of the LED light source 11, and at a spacing in excess of 100 mm, the wavelength conversion member 13 may become too large.

The light-emitting device 10 of the above-mentioned construction is configured such that the wavelength conversion member 13 disposed outside the light-emitting element (including the LED light source 11 and the wavelength conversion member 12) may be seen as the outer appearance of the light-emitting device 10. Accordingly, when the light-emitting device 10 is in the unlit state, the wavelength conversion member is in the non-emissive state, and exhibits a pale yellow color expressed as $L^*=40$ to 60, $a^*=0$ to $+1$, and $b^*=+2$ to $+15$ according to CIELAB (CIE 1976). It is unlikely that the light-emitting device 10 adversely affects the esthetic appearance of an installation space (e.g., interior space in general housing). It is noted that a transparent protective cover may be provided so as to cover the wavelength conversion member 13.

Since the light-emitting device 10 of the invention is constructed such that the phosphors in both the wavelength conversion members 12 and 13 are excited in sequence by the excitation light from the common LED light source 11, uniform light of consistent chromaticity is produced without a difference in emission color which is found in a light-emitting device comprising a plurality of LED light sources, due to variations of LED outputs. Also the light-emitting device 10 of the invention offers a high freedom to the step of toning the color of light emission via simple adjustment because the wavelength conversion members 12 and 13 whose phosphor contents have been adjusted in proportion to light emission of the desired chromaticity may be mounted at the last stage of assembly of the light-emitting device 10. Notably, when the inventive wavelength conversion member 13 uses a manganese-activated complex fluoride phosphor as the red phosphor, the light-emitting device 10 ensures easy toning because the majority of light in the green wavelength region (or yellow wavelength region) is transmitted by the member 13.

It is noted that a reflector 15 may be provided backward of the LED light source 11 for reflecting the light from the LED light source 11 and the light reflected or wavelength converted by the wavelength conversion members 12 and 13, toward the wavelength conversion members 12 and 13. While a fraction of incident light is reflected or wavelength converted by the wavelength conversion members 12 and 13, the provision of the reflector 15 for reflecting these light fractions emerging toward the LED light source 11 is effective for improving emission efficiency.

Figure 2:
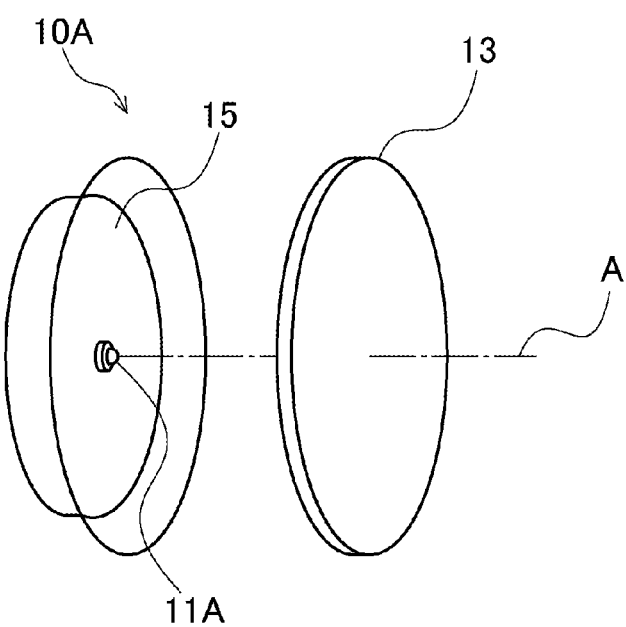
FIG. 2 is a schematic perspective view showing another construction of a light-emitting device according to the first embodiment of the invention.

FIG. 2 is a perspective view showing components of a light-emitting device according to another version of the first embodiment of the invention.

The light-emitting device of the invention is depicted at 10A in FIG. 2 as comprising an LED light source 11A capable of emitting pseudo-white light containing a blue wavelength component and the inventive wavelength conversion member 13 disposed on the optical axis A of the light source 11A.

The LED light source 11A used herein is a light source of pseudo-white light emission, for example, comprising a blue LED chip capable of emitting blue light of wavelength 420 to 490 nm, preferably 440 to 470 nm, and wavelength conversion means which is formed by coating the surface of the blue LED chip with a resin coating composition containing a yellow or green phosphor.

The wavelength conversion member 13 and reflector 15 are the same as in FIG. 1.

The light-emitting device 10A of the above-mentioned construction is configured such that the wavelength conversion member 13 disposed outside the light-emitting element (LED light source 11A) may be seen as the outer appearance of the light-emitting device 10A. Accordingly, when the light-emitting device 10A is in the unlit state, the wavelength conversion member 13 is in the non-emissive state, and exhibits a pale yellow color expressed as $L^*=40$ to 60, $a^*=0$ to +1, and $b^*=+2$ to +15 according to the above colorimetric system (CIELAB (CIE 1976)). It is unlikely that the light-emitting device 10A adversely affects the esthetic appearance of an installation space. In the lit state of the light-emitting device 10A, the LED light source 11A emits pseudo-white light (e.g., blue light and yellow light), which enters the wavelength conversion member 13, where a portion of blue light in the pseudo-white light is absorbed by the phosphor, typically complex fluoride phosphor in the wavelength conversion member 13 and converted into light containing a red wavelength region (red light), whereupon the red light emerges together with the remainder of blue light and yellow light transmitted by the wavelength conversion member 13. As a result, blue light, yellow light and red light are emitted in a predetermined ratio to produce white light having high color rendering.

Figure 3:
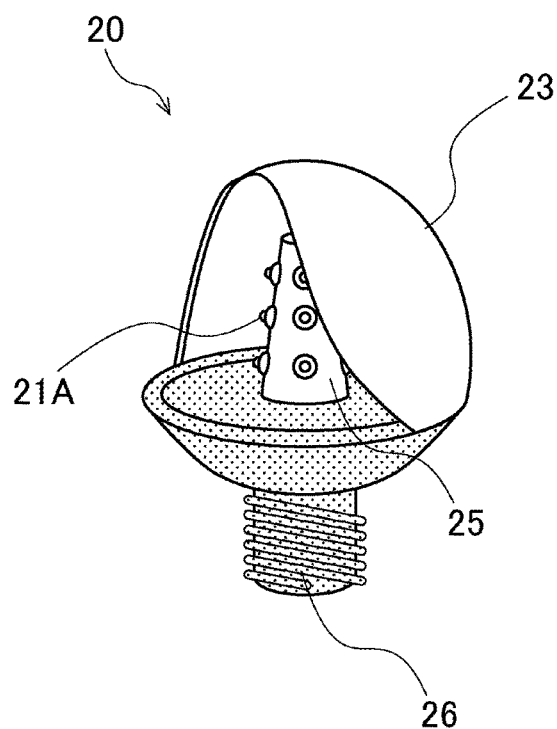
FIG. 3 is a schematic perspective view showing components of a light-emitting device according to a second embodiment of the invention.

FIG. 3 is a perspective view showing components of a light-emitting device according to a second embodiment of the invention. FIG. 3 is a partially cutaway view so that internal components in a center-to-left portion may be seen.

The inventive light-emitting device of the bulb type is depicted at 20 in FIG. 3 as comprising a wavelength conversion member 23 of the invention in the form of a bulb cover having substantially semi-spherical shape, a reflector 25 in the form of an upward tapered cylinder serving as a support, received within the bulb cover, and an LED light source 21A capable of emitting pseudo-white light containing a blue wavelength component, arranged on the peripheral surface of the reflector 25. Electric power is supplied to the LED light source 21A via a base 26.

The light-emitting device 20 of the above-mentioned construction is configured such that the wavelength conversion member 23 disposed outside the light-emitting element (LED light source 21A) may be seen as the outer appearance (bulb cover) of the light-emitting device 20. Accordingly, when the light-emitting device 20 is in the unlit state, the wavelength conversion member 23 is in the non-emissive state, and exhibits a pale yellow color expressed as $L^*=40$ to 60, $a^*=0$ to +1, and $b^*=+2$ to +15 according to the above colorimetric system (CIELAB (CIE 1976)). It is unlikely that the light-emitting device 20 adversely affects the esthetic appearance of an installation space (e.g., interior space in general housing). In the lit state of the light-emitting device 20, the LED light source 21A emits pseudo-white light (e.g., blue light and yellow light), the pseudo-white light enters the wavelength conversion member 23, and a portion of blue light in the pseudo-white light is converted into red light by the wavelength conversion member 23, whereupon pseudo-white light having high color rendering is obtained.

The light-emitting device of the invention is not limited to the above-illustrated embodiments of FIGS. 1 to 3 as long as it comprises a light-emitting element including an LED light source capable of emitting at least blue light, and adapted to emit pseudo-white light containing a blue wavelength component, and a wavelength conversion member according to the invention disposed outside the light-emitting element.

Figure 4:
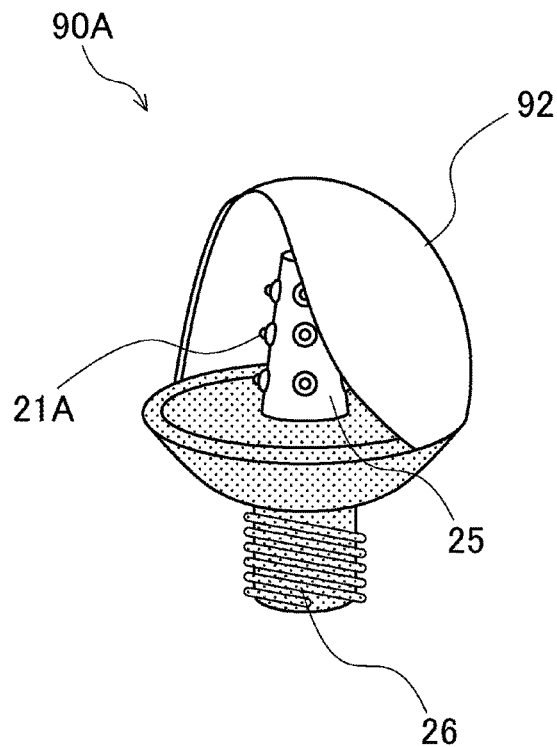
FIG. 4 is a schematic perspective view showing Sample #1 of prior art light-emitting device.
Figure 5:
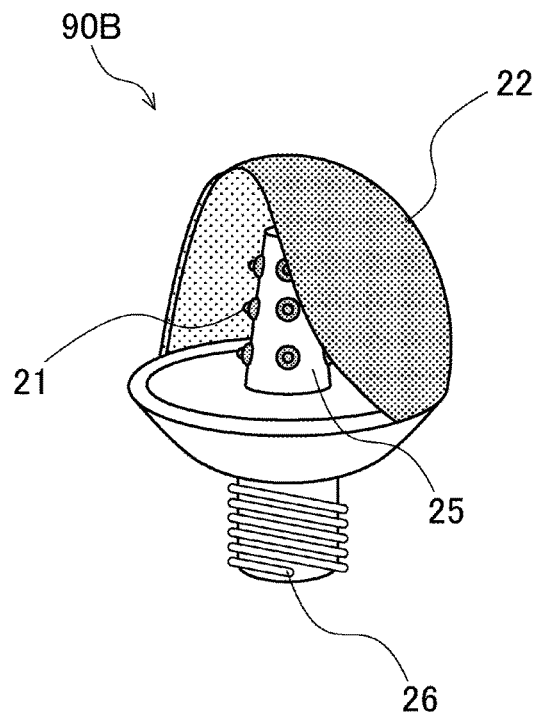
FIG. 5 is a schematic perspective view showing Sample #2 of prior art light-emitting device.
Figure 6:
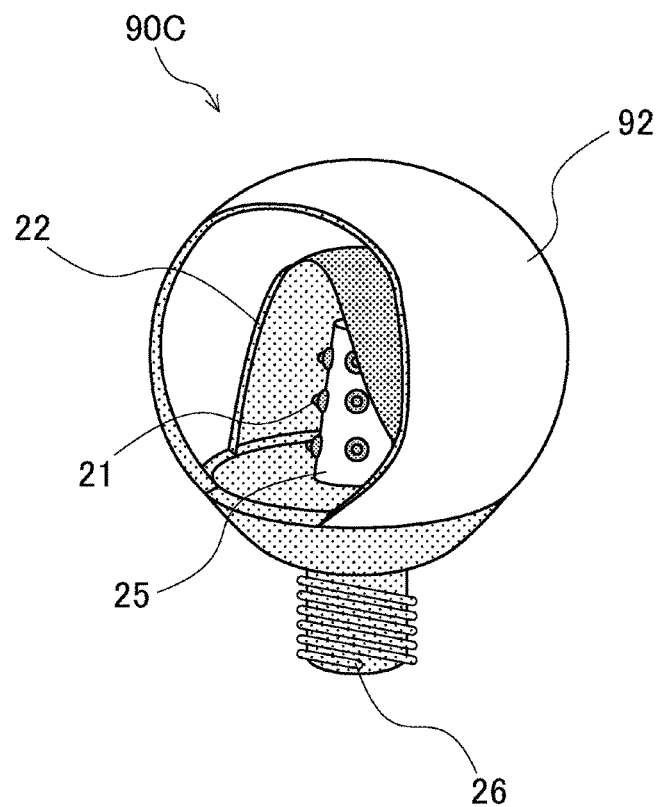
FIG. 6 is a schematic perspective view showing Sample #3 of prior art light-emitting device.

With respect to outer appearance in the unlit state, color rendering and emission efficiency, the light-emitting device 20 illustrated as above is evaluated relative to prior art light-emitting devices of the bulb type shown in FIGS. 4 to 6, with the results shown in Table 1.

Each of FIGS. 4 to 6 is a partially cutaway view so that internal components in a center-to-left portion may be seen. The light-emitting device 90A (Comparative Bulb #1) of FIG. 4 corresponds to the light-emitting device 20 of FIG. 3 except that the wavelength conversion member 23 is replaced by a lamp shade 92 made of a phosphor-free white resin. The light-emitting device 90B (Comparative Bulb #2) of FIG. 5 corresponds to the light-emitting device 20 of FIG. 3 except that the LED light source 21A is replaced by an LED light source 21 capable of emitting blue light and the wavelength conversion member 23 is replaced by a wavelength conversion member 22 in the form of a molded resin having a yellow phosphor dispersed therein. The light-emitting device 90C (Comparative Bulb #3) of FIG. 6 corresponds to the light-emitting device 90B of FIG. 5 except that a lamp shade 92 made of a phosphor-free white resin is disposed outside the light-emitting element (including LED light source 21 and wavelength conversion member 22).

TABLE 1

|  | Invention FIG. 3 | Comparative Bulb #1 FIG. 4 | Comparative Bulb #2 FIG. 5 | Comparative Bulb #3 FIG. 6 |
| --- | --- | --- | --- | --- |
| Outer appearance in unlit state | pale yellow | milky white | orange | milky white |

TABLE 1-continued

|  | | Invention FIG. 3 | Comparative Bulb #1 FIG. 4 | Comparative Bulb #2 FIG. 5 | Comparative Bulb #3 FIG. 6 |
|---|---|---|---|---|---|
| Color rendering (average color rendering index) | | good (Ra 92) | poor (Ra 68) | fairly good (Ra 80) | fairly good (Ra 80) |
| Emission efficiency | | good | somewhat low | good | somewhat low |
| Construction | LED | pseudo-white | pseudo-white | blue | blue |
| | Wavelength conversion member | molding of complex fluoride phosphor-dispersed resin | — | molding of yellow phosphor-dispersed resin | molding of yellow phosphor-dispersed resin |
| | Lamp shade | — | white resin | — | white resin |

In Table 1, Comparative Bulb #1 of FIG. 4 provides a good outer appearance in the unlit state by virtue of the white lamp shade 92, but its color rendering is poor because of less red wavelength component, and its emission efficiency is somewhat inferior owing to the lamp shade. Comparative Bulb #2 of FIG. 5 provides an unfavorable outer appearance in the unlit state because the yellow wavelength conversion member 22 is seen, and its emission color is inferior to the inventive bulb because of less red wavelength component. Comparative Bulb #3 of FIG. 6 provides a good outer appearance in the unlit state by virtue of the white lamp shade 92, but its color rendering is fairly good because of less red wavelength component, and its emission efficiency is somewhat inferior owing to shielding by the lamp shade 92.

In contrast, the inventive bulb (light-emitting device 20) of FIG. 3 is good in all these factors.

The wavelength conversion member of the invention is a remote phosphor plate suited as a lamp shade or lamp cover. The light-emitting device of the invention is suited as a light-emitting device of remote phosphor technology wherein the wavelength conversion member is applied as a lamp shade or lamp cover, especially a lighting device.

EXAMPLES

Examples and Comparative Examples are given below for illustrating the invention, but the invention is not limited thereto.

Examples 1 to 3 and Comparative Examples 1 to 3

An LED light-emitting device was manufactured under the following conditions.

On a twin-screw extruder, $K_2(Si_{0.97}Mn_{0.03})F_6$ phosphor powder having a particle size D50 of 17.6 μm was incorporated into transparent polypropylene pellets, yielding the $K_2(Si_{0.97}Mn_{0.03})F_6$-loaded polypropylene pellets having a $K_2(Si_{0.97}Mn_{0.03})F_6$ concentration of 5 wt % or 10 wt %.

Using a 20-t horizontal injection molding machine, the $K_2(Si_{0.97}Mn_{0.03})F_6$-loaded polypropylene pellets were molded into a disk-shaped red wavelength conversion member having a thickness of 2 mm and a diameter of 100 mm.

Also, pellets were prepared by incorporating 5 wt % or 10 wt % of $Y_3Al_5O_{12}:Ce^{3+}$ phosphor in polycarbonate resin, or incorporating 10 wt % of $Lu_3Al_5O_{12}:Ce^{3+}$ phosphor in polycarbonate resin. The polycarbonate pellets were injection molded into a disk-shaped yellow wavelength conversion member having a thickness of 2 mm and a diameter of 100 mm.

Figure 7:
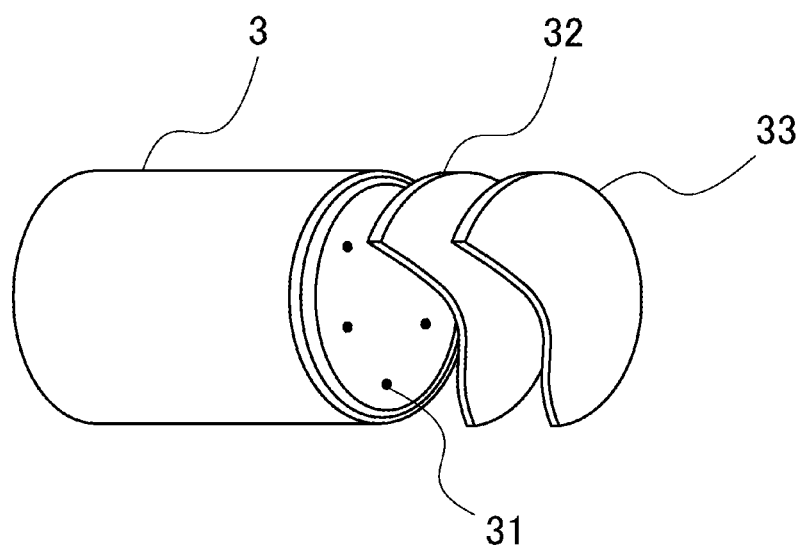
FIG. 7 is a schematic perspective view showing components of a pseudo-white LED light-emitting device used for evaluation in Examples.

An LED light-emitting device was constructed as shown in FIG. 7 by placing the two types of wavelength conversion members 32 and 33 on an optical axis and forward of an LED projector 3 including LED chips 31 (LED light source), available as GL-RB100 (having six 2-W blue LED chips XT-E Royal Blue by Cree, Inc.) from Hino Electronic Corp., such that the yellow wavelength conversion member 32 ($Y_3Al_5O_{12}:Ce^{3+}$ phosphor content 5 wt % or $Lu_3Al_5O_{12}:Ce^{3+}$ phosphor content 10 wt %) and the red wavelength conversion member 33 (phosphor content 5 wt % or 10 wt %) were arranged in sequence from the LED projector 3 side. For comparison sake, a light-emitting device was also manufactured in which the red wavelength conversion member 33 was omitted and only the yellow wavelength conversion member 32 ($Y_3Al_5O_{12}:Ce^{3+}$ phosphor content 5 wt % or 10 wt %, or $Lu_3Al_5O_{12}:Ce^{3+}$ phosphor content 10 wt %) was disposed.

Outside the light-emitting element of the LED light-emitting device thus manufactured, the outer appearance color under white light in the unlit state was measured by a Chroma Meter CR200 (Konica-Minolta Optics Co., Ltd.), evaluated according to CIELAB, and visually observed. The results are shown in Table 2. The outer appearance as visually observed was determined by the wavelength conversion member disposed outermost. The devices of Examples 1 to 3 looked pale yellow whereas the devices of Comparative Examples 1 to 3 looked yellow.

TABLE 2

| | LED side wavelength conversion member | | Remote wavelength conversion member | | Unlit state | | | |
|---|---|---|---|---|---|---|---|---|
| | Phosphor type | Phosphor content (wt %) | Phosphor type | Phosphor content (wt %) | CIELAB (CIE 1976) | | | Outer appearance as visually observed |
| | | | | | L* | a* | b* | |
| Example 1 | $Y_3Al_5O_{12}:Ce^{3+}$ | 5 | $K_2(Si_{0.07}Mn_{0.03})F_6$ | 10 | 50.58 | +0.46 | +11.06 | pale yellow |
| Example 2 | $Y_3Al_5O_{12}:Ce^{3+}$ | 5 | $K_2(Si_{0.07}Mn_{0.03})F_6$ | 5 | 43.65 | +0.27 | +3.70 | pale yellow |
| Example 3 | $Lu_3Al_5O_{12}:Ce^{3+}$ | 10 | $K_2(Si_{0.07}Mn_{0.03})F_6$ | 5 | 43.75 | +0.32 | +3.60 | pale yellow |
| Comparative Example 1 | $Y_3Al_5O_{12}:Ce^{3+}$ | 5 | — | — | 64.26 | −11.46 | +53.40 | yellow |
| Comparative Example 2 | $Y_3Al_5O_{12}:Ce^{3+}$ | 10 | — | — | 72.11 | −12.22 | +65.90 | deep yellow |
| Comparative Example 3 | $Lu_3Al_5O_{12}:Ce^{3+}$ | 10 | — | — | 63.95 | −16.72 | +38.13 | yellowish green |

Using an illuminance spectrophotometer CL-500A (Konica-Minolta Optics Co., Ltd.) spaced 20 cm from the LED light-emitting device, the light-emitting device was evaluated for average color rendering index Ra and special color rendering index ΔR9. The results are shown in Table 3.

TABLE 3

| | Average color rendering index Ra | Special color rendering index ΔR9 |
|---|---|---|
| Example 1 | 92 | 90 |
| Example 2 | 98 | 98 |
| Example 3 | 90 | 92 |
| Comparative Example 1 | 73 | −59 |
| Comparative Example 2 | 66 | −40 |
| Comparative Example 3 | 65 | −63 |

It has been demonstrated that the LED light-emitting device according to the invention achieves significant improvements in average color rendering index Ra and special color rendering index ΔR9 over the LED light-emitting device using only the yellow wavelength conversion member. The outside of the light-emitting element in the unlit state looks pale yellow, and as such does not adversely affect the esthetic appearance of the light-emitting device in the unlit state. Thus a prior art lamp shade or any obstacle which will adversely affect emission efficiency may be omitted.

Although the invention has been described with reference to the embodiments illustrated in the drawing, the invention is not limited thereto, and other embodiments may occur to, or various additions, changes and deletions may be made by those skilled in the art. All such embodiments fall in the scope of the invention as long as the advantages and results of the invention are obtainable.

REFERENCE SIGNS LIST

10, 10A, 20, 90A, 90B, 90C light-emitting device
11, 11A, 21, 21A, 31 LED light source
12, 22, 32 other wavelength conversion member (yellow or green wavelength conversion member)
13, 23, 33 wavelength conversion member (red wavelength conversion member)
15, 25 reflector
26 base
3 LED projector
92 lamp shade
A optical axis

The invention claimed is:

1. A wavelength conversion member which is a molded resin having dispersed therein a phosphor capable of absorbing light of a blue wavelength component and emitting light containing a red wavelength component wherein the wavelength conversion member in the non-emissive state has a color expressed as L*=40 to 60, a*=0 to +1, and b*=+2 to +15 according to CIELAB (CIE 1976).

2. The wavelength conversion member of claim 1 wherein said phosphor is a complex fluoride phosphor having the formula (1):

$$A_2(M_{1-x}Mn_x)F_6 \quad (1)$$

wherein M is one or two or more of tetravalent elements selected from Si, Ti, Zr, Hf, Ge, and Sn, A is one or two or more of alkali metals selected from Li, Na, K, Rb, and Cs and containing at least Na and/or K, and x is a number of 0.001 to 0.3.

3. The wavelength conversion member of claim 2 wherein the complex fluoride phosphor is manganese-activated potassium silicofluoride of the formula: $K_2(Si_{1-x}Mn_x)F_6$ wherein M and x are as defined above.

4. The wavelength conversion member of claim 1 wherein the phosphor is present in an amount of 2 to 30% by weight.

5. The wavelength conversion member of claim 1, having an average thickness of 0.05 to 5 mm.

6. The wavelength conversion member of claim 1 wherein said resin is a thermoplastic resin.

7. The wavelength conversion member of claim 1 which is a lamp cover or lamp shade.

8. A light-emitting device comprising
a light-emitting element including an LED light source capable of emitting at least blue light, and adapted to emit pseudo-white light containing a blue wavelength component, and
the wavelength conversion member of claim 1, disposed outside the light-emitting element.

9. The light-emitting device of claim 8, further comprising a transparent protective cover covering the wavelength conversion member.

10. The wavelength conversion member of claim 2 wherein the phosphor is present in an amount of 2 to 30% by weight.

11. The wavelength conversion member of claim 3 wherein the phosphor is present in an amount of 2 to 30% by weight.

12. The wavelength conversion member of claim 2, having an average thickness of 0.05 to 5 mm.

13. The wavelength conversion member of claim 3, having an average thickness of 0.05 to 5 mm.

14. The wavelength conversion member of claim 4, having an average thickness of 0.05 to 5 mm.

15. The wavelength conversion member of claim 2 wherein said resin is a thermoplastic resin.

16. The wavelength conversion member of claim 3 wherein said resin is a thermoplastic resin.

17. The wavelength conversion member of claim 4 wherein said resin is a thermoplastic resin.

18. The wavelength conversion member of claim 5 wherein said resin is a thermoplastic resin.

19. The wavelength conversion member of claim 2 which is a lamp cover or lamp shade.

20. The wavelength conversion member of claim 3 which is a lamp cover or lamp shade.

* * * * *